United States Patent
Gu et al.

(10) Patent No.: US 12,226,855 B2
(45) Date of Patent: Feb. 18, 2025

(54) IRON-ALUMINUM-BASED INTERMETALLIC COMPOUND FILTER ELEMENT AND PREPARATION METHOD THEREOF

(71) Applicant: AT&M ENVIRONMENTAL ENGINEERING TECHNOLOGY CO., LTD., Beijing (CN)

(72) Inventors: Hu Gu, Beijing (CN); Junjun Yang, Beijing (CN); Fan Wang, Beijing (CN); Guanying Liu, Beijing (CN); Yu Zhang, Beijing (CN); Ying Dai, Beijing (CN); Xuan Yang, Beijing (CN); Kun Wang, Beijing (CN); Shiyu Lin, Beijing (CN)

(73) Assignee: AT&M ENVIRONMENTAL ENGINEERING TECHNOLOGY CO., LTD., Beijing (CN)

( * ) Notice: Subject to any disclaimer, the term of this patent is extended or adjusted under 35 U.S.C. 154(b) by 206 days.

(21) Appl. No.: 17/791,495

(22) PCT Filed: Jun. 4, 2020

(86) PCT No.: PCT/CN2020/094403
§ 371 (c)(1),
(2) Date: Jul. 7, 2022

(87) PCT Pub. No.: WO2021/139081
PCT Pub. Date: Jul. 15, 2021

(65) Prior Publication Data
US 2023/0219173 A1    Jul. 13, 2023

(30) Foreign Application Priority Data
Jan. 10, 2020  (CN) .......................... 202010027214.3

(51) Int. Cl.
*B23K 28/02*    (2014.01)
*B22F 1/10*     (2022.01)
*B22F 3/12*     (2006.01)

(52) U.S. Cl.
CPC ................ *B23K 28/02* (2013.01); *B22F 1/10* (2022.01); *B22F 3/12* (2013.01); *B22F 2998/10* (2013.01); *B22F 2999/00* (2013.01)

(58) Field of Classification Search
CPC ... B23K 28/02; B22F 1/10; B22F 3/12; B01D 39/00; B01D 39/02; B01D 39/06;
(Continued)

(56) References Cited

FOREIGN PATENT DOCUMENTS

| CN | 1833750 A   | 9/2006 |
|----|-------------|--------|
| CN | 101195187 A | 6/2008 |

(Continued)

OTHER PUBLICATIONS

International Search Report of PCT/CN2020/094403.
Written Opinion of PCT/CN2020/094403.

*Primary Examiner* — Ricardo D Morales (57) ABSTRACT

The present invention discloses a Fe—Al intermetallic compound filter element and a preparation method thereof, which relates to the field of powder metallurgy and filtration technology. In view of the drawback in the prior art that using a fiber felt as a filtration layer reduces stability and reliability of a filter, the present invention provides an Fe—Al intermetallic compound filter element, which comprises: at least two filter-element parts, and a rebar connecting the at least two filter-element parts transversely by means of welding, wherein, the filter-element parts each
(Continued)

comprises at least two segments of Fe—Al intermetallic compound filter-element powder tube and a connector connecting the at least two segments of Fe—Al intermetallic compound filter-element powder tube end-to-end by means of welding; and wherein, the at least two segments of Fe—Al intermetallic compound filter-element powder tube each comprises a substrate framework and a surface filtration membrane.

8 Claims, 7 Drawing Sheets

(58) Field of Classification Search
CPC .... B01D 39/10; B01D 39/20; B01D 39/2027; B01D 39/2031; B01D 39/2037; B01D 39/2048

See application file for complete search history.

(56) References Cited

FOREIGN PATENT DOCUMENTS

| | | | |
|---|---|---|---|
| CN | 101524609 | A * | 9/2009 |
| CN | 201613084 | A | 10/2010 |
| CN | 101890500 | A | 11/2010 |
| CN | 102489078 | A | 6/2012 |
| CN | 102489079 | A | 6/2012 |
| CN | 202933537 | U | 5/2013 |
| CN | 202962084 | U | 6/2013 |
| CN | 103357881 | A | 10/2013 |
| CN | 103446889 | A | 12/2013 |
| CN | 103695689 | A | 4/2014 |
| CN | 104190137 | A | 12/2014 |
| CN | 204073574 | A | 1/2015 |
| CN | 205461268 | U * | 8/2016 |
| CN | 110433570 | A | 11/2019 |
| CN | 111098051 | A | 5/2020 |
| CN | 211727994 | U | 10/2020 |
| JP | 0318483 | A | 1/1991 |
| WO | 9532048 | A1 | 11/1995 |

* cited by examiner

IRON-ALUMINUM-BASED INTERMETALLIC COMPOUND FILTER ELEMENT AND PREPARATION METHOD THEREOF

CROSS-REFERENCE TO RELATED APPLICATIONS

This Application is a national stage application of PCT/CN2020/094403. This application claims priorities from PCT Application No. PCT/CN2020/094403, filed Jun. 4, 2020, and from the Chinese patent application 202010027214.3 filed Jan. 10, 2020, the content of which are incorporated herein in the entirety by reference.

TECHNICAL FIELD

The present disclosure relates to the field of powder metallurgical materials and filtration technologies, and specifically to the field of iron-aluminum-based (hereinafter referred to as Fe—Al) intermetallic compound filter elements and preparation method thereof, and in particular to the field of Fe—Al intermetallic compound filter elements used in E-gas coal gasification process and preparation method thereof.

BACKGROUND

So far, Jamnagar Petrochemical Complex in India is currently the largest petrochemical complex in the world, where Reliance Industries Limited has built the world's largest single-train refinery (67 million tons/year). Upstream coal chemistry in Jamnagar Petrochemical Complex uses E-Gas coal gasification technology from McDermott Corporation (formerly CB&I), USA. Its E-GAS gasifier adopts a cross-shaped structure, coal-water slurry feedstock, two-stage gasification, and crude syngas configurations for waste heat boiler process. The first stage is a horizontal cylinder, operating at a slag temperature of 1316° C.-1427° C.; the second stage is an upright cylinder lined with refractory material and perpendicular to the first stage, adopts an upward entrained-flow form, and has one-way coal slurry evenly distributed through a nozzle to hot coal gas coming from the first stage, the amount of coal-water slurry injected being 10%-15% of total amount. The second stage is to utilize the hot gas coming from the first stage, thus lowering temperature of mixture to 1038° C., to ensure normal operation of a heat recovery system. Feedstock can be bituminous coal, sub-bituminous coal and petroleum coke, and cleaned syngas can be used to produce hydrogen, fertilizer, transportation fuel, synthetic natural gas (SNG), methanol or power generation from an integrated gasification combined cycle power system (IGCC).

At present, there are four coal chemical companies in the world using this technology, which are Wabash River (1 unit) in USA, POSCO (3 units) in Korea, Reliance Industries Limited (10 units) in India and CNOOC Huizhou Refinery (3 units) in China, in the order of plant construction. Among them, the first two companies have stopped their projects for different reasons, and now only Reliance Industries Limited Jamnagar Petrochemical Project (RIL project) and CNOOC Huizhou Refinery are still in operation.

The E-Gas technology involves setting up a set of two coke filters in gasification process for removing solid particles entrained in syngas. The coke filters operates at operating temperatures of 320-350° C., operating pressures of 4-5 MPa, and backblowing pressures of up to 10-11 MPa; in addition, because the solid particles to be filtered are so tiny that more than 10% (volume percentage) of the particles are less than 2 microns in size, and the process gas contains gases that are highly corrosive under high temperature and hot and humid environments, such as $H_2S$, $CO_2$, HCl, etc., the coke filters are subject to extremely demanding working conditions. Traditionally, coke filters used in E-Gas process usually adopt fiber-felt filter elements; however, during their use, there always exist problems such as fast rise of differential pressure of coke filters, short life of blowback ball valve, frequent abnormal stopping of system, and rupture of filter element. A sintered-metal-fiber filter element has a main structure as follows: inner and outer layers (i.e., two lays) of metal wire mesh as protective layers, a middle layer of metal-fiber-felt filter, and an innermost layer using a Johnson Screen as a support layer; such filter element has a complicated structure and mainly relies on metal fibers in the middle of the filter element to implement filtration; since the fiber-felt filter layer is a flexible material, its filtration mode pertains to depth filtration, and once fine metal particles are embedded in labyrinth-like pore channels between metal fibers, it is difficult to blow back these fine particles out through pulse backblowing, making the filter's flux gradually decrease and differential pressure gradually increase, which seriously affects continuous and stable operation of the filter.

The existing sintered-metal-fiber filter element mainly relies on metal fiber felt in the middle of the filter element to implement filtration when in use, which pertains to depth filtration. The filter element after use is prone to blockage of a large number of labyrinthine pores of the fiber felt, resulting in a poorer backblowing effect and a faster rise in differential pressure, and also prone to tearing in use due to the fiber felt's own relatively low strength.

SUMMARY

The technical problem to be solved by the present disclosure is to provide a Fe—Al intermetallic compound powder filter element. In the technical solution of the present disclosure, mainly included are: techniques for designing a longitudinal structure (i.e., an at least two-segment structure) and a transverse cross-sectional structure (i.e., an asymmetric composite structure) of an asymmetric powder filter element, and a method for group installation of the filter element, which are all key technologies for ensuring that the filter element has high precision, high flux, low flow resistance, good backwashing and regeneration performance and excellent overall structural strength.

According to the above object, the present disclosure provides a Fe—Al intermetallic compound filter element, characterized in that, the Fe—Al intermetallic compound filter element comprises: at least two filter-element parts, and a rebar connecting the at least two filter-element parts transversely by means of welding, wherein, the filter-element parts each comprises: at least two segments of Fe—Al intermetallic compound filter-element powder tube, and a connector connecting the at least two segments of Fe—Al intermetallic compound filter-element powder tube end-to-end by means of welding; and wherein, the at least two segments of Fe—Al intermetallic compound filter-element powder tube each comprises: a substrate framework and a surface filtration membrane on an exterior of the substrate framework, the substrate framework being a pressed-and-sintered pre-alloyed Fe—Al intermetallic compound powder.

The present disclosure further provides a method for preparing a Fe—Al intermetallic compound filter element, characterized in that, the method comprises the following steps: preparing a substrate framework of the Fe—Al intermetallic compound filter element, by isostatically pressing and molding pre-alloyed Fe—Al intermetallic compound powder and then vacuum sintering an isostatically pressed and molded green body to form the substrate framework; preparing a filter-element part of the Fe—Al intermetallic compound filter element, wherein, at least two segments of the substrate framework are welded together end-to-end, through a connector respectively, and undergo secondary sintering after being coated with a surface filtration membrane, thus forming the filter-element part; and connecting the at least two filter-element parts transversely through a rebar by means of welding, thus forming the Fe—Al intermetallic compound filter element.

Therefore, the present disclosure adopts a Fe—Al intermetallic compound with good resistance to high-temperature oxidation and sulfide corrosion as medium of a filter element, and optimizes designing of a structure of the Fe—Al powder filter element, so that it can meet requirements on use of coke filters. The filter element is prepared by means of a segmented connection, which makes overall structural strength of the filter element highly reliable. A cross-sectional structure of the filter element adopts an asymmetric composite structure made up of "substrate framework+surface filtration membrane", so that the asymmetric powder filter element has a relatively small pore size, which makes the filter element have high filtration accuracy; in addition, the asymmetric powder filter element is a rigid medium, and its filtration mode pertains to surface filtration, thus, most tiny solid particles are intercepted on an exterior surface of the filter element during filtration, and can be blown off during pulse backblowing, which makes the filter element have a good backblowing regeneration effect, and thereby greatly reduces a rise rate of differential pressure of a related filter during operation, so that the filter element flux can be maintained at a high level. Moreover, the asymmetric powder filter element is installed in group, with each group integrating at least two filter-element parts, and is secured by welding of a rebar at a position of a connecting ring respectively, thus effectively improving overall structural strength of the filter element, preventing deformation or fracture of the filter element in use, improving stability and reliability of a related filter's operation, and thereby substantially increasing service life of the related filter. Therefore, successful development of the present disclosure is of great practical importance for solving problems of existing coke filters.

DETAILED DESCRIPTION

Hereinafter, the present disclosure will be described in detail with reference to the accompanying drawings, in which same reference numerals indicate same components, and in which: 1 Connection head; 2 Filter-element powder tube; 3 Upper connecting ring; 4 Lower connecting ring; 5 Bottom sealing ring; 6 Bottom cover; 7 Substrate framework; 8 Surface filtration membrane; 9 Rebar (reinforcement bar); 10 Positioning pin.

Figure 1:
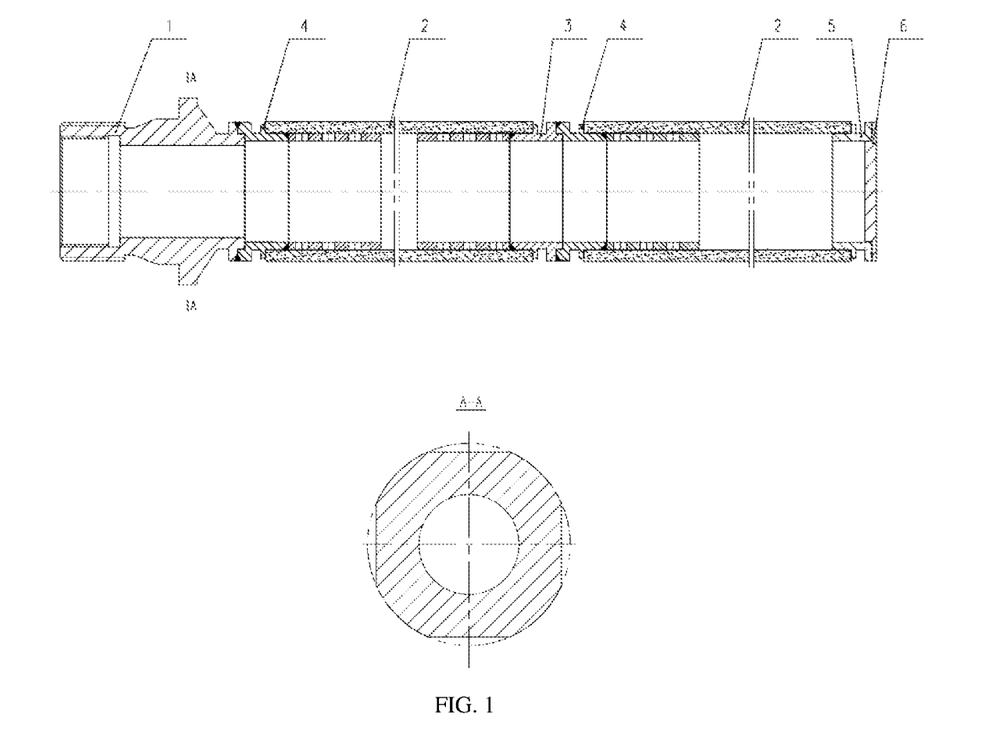
FIG. 1 is a schematic diagram of a structure of a filter-element part, which is in a two-segment structure, in a Fe—Al intermetallic compound filter element in accordance with the present disclosure.

FIG. 1 is a schematic diagram of a structure of a filter-element part, which is in a two-segment structure, in a Fe—Al intermetallic compound filter element in accordance with the present disclosure. As FIG. 1 shows, in the Fe—Al intermetallic compound filter element in accordance with the present disclosure, a single filter-element part is formed by means of welding two segments of Fe—Al-intermetallic-compound-powder-made filter-element powder tube 2 end-to-end through a respective connector, wherein, the connector include an upper connecting ring 3, a lower connecting ring 4 and a bottom sealing ring 5. Any two adjacent segments of filter-element powder tube 2 are connected together through the upper connecting ring 3 and the lower connecting ring 4 by means of welding, while the last segment of filter-element powder tube 2 is connected through the bottom sealing ring 5 to a bottom cover 6 by means of welding, and the first segment of filter-element powder tube 2 is connected through the lower connecting ring 4 to a connection head 1 by means of welding, wherein, all welding is performed by using fusion welding, preferably by using plasma welding, with welding process parameters as follows: welding current: 50-60 A, argon gas flow rate 10-15 L/min, welding speed 150-180 mm/min, ion gas flow rate 1±0.1 L/min, and GCrMo91 welding wire. In this way, the single filter-element part is obtained.

Figure 2:
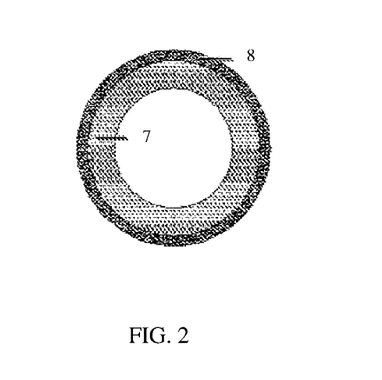
FIG. 2 is a schematic diagram of a transverse cross-sectional structure of a filter-element powder tube, in a filter-element part in accordance with the present disclosure.

As shown in FIG. 2, the filter-element powder tube 2 in the filter-element part in accordance with the present disclosure comprises a substrate framework 7 and a surface filtration membrane 8 coated on an exterior surface of the substrate framework 7, both of which constitute an asymmetric composite structure, wherein, the substrate has a relatively large thickness, a relatively high strength, a relatively large pore size and good aeration, and thus can improve fluid flux, while the surface filtration membrane has a relatively thin thickness and a relatively small pore size, and thus can improve filtration accuracy when filtering from outside to inside. The substrate framework 7 is a pressed-and-sintered pre-alloyed Fe—Al intermetallic compound powder, while the surface filtration membrane 8 is a mixture of binder, water and pre-alloyed Fe—Al intermetallic compound powder that has been secondarily sintered after being coated on the substrate framework 7, wherein, the above-mentioned binder may be at least one of polyethylene glycol, methyl cellulose, and polyvinyl alcohol.

A weight ratio of all components of the above-mentioned mixture is binder:water:Fe—Al intermetallic compound powder=1-10:100:200-300. The surface filtration membrane 8 preferably has a thickness of 100-200 μm.

In the above and subsequent descriptions of the present disclosure, for details on a preparation method of pre-alloyed Fe—Al intermetallic compound powder, see Patent No. ZL 200610057538.1, titled "PREPARATION METHOD AND USE OF IRON-ALUMINUM-BASED INTERMETALLIC COMPOUND MICROPOROUS FILTER ELEMENT".

Figure 3:
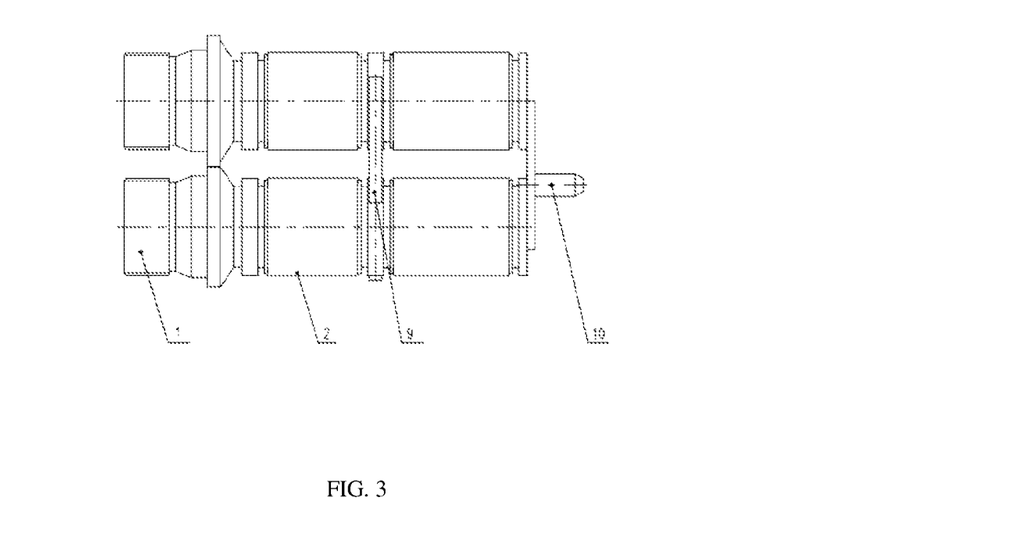
FIG. 3 is a schematic diagram of a structure of a Fe—Al intermetallic compound filter element (having three filter-element parts) in accordance with the present disclosure.

FIG. 3 is a schematic diagram of a structure of a Fe—Al intermetallic compound filter element in accordance with the present disclosure. As shown in FIG. 3, the Fe—Al intermetallic compound filter element comprises three filter-element parts, which form a group and are secured by welding of a rebar 9 at the positions of the connectors respectively, wherein, the bottoms of the three filter-element parts are connected together by a positioning pin 10, thus the three filter-element parts share the one common positioning pin, which facilitates installation of the filter-element parts, and the three filter-element parts are distributed in an equilateral triangle.

Figure 4:
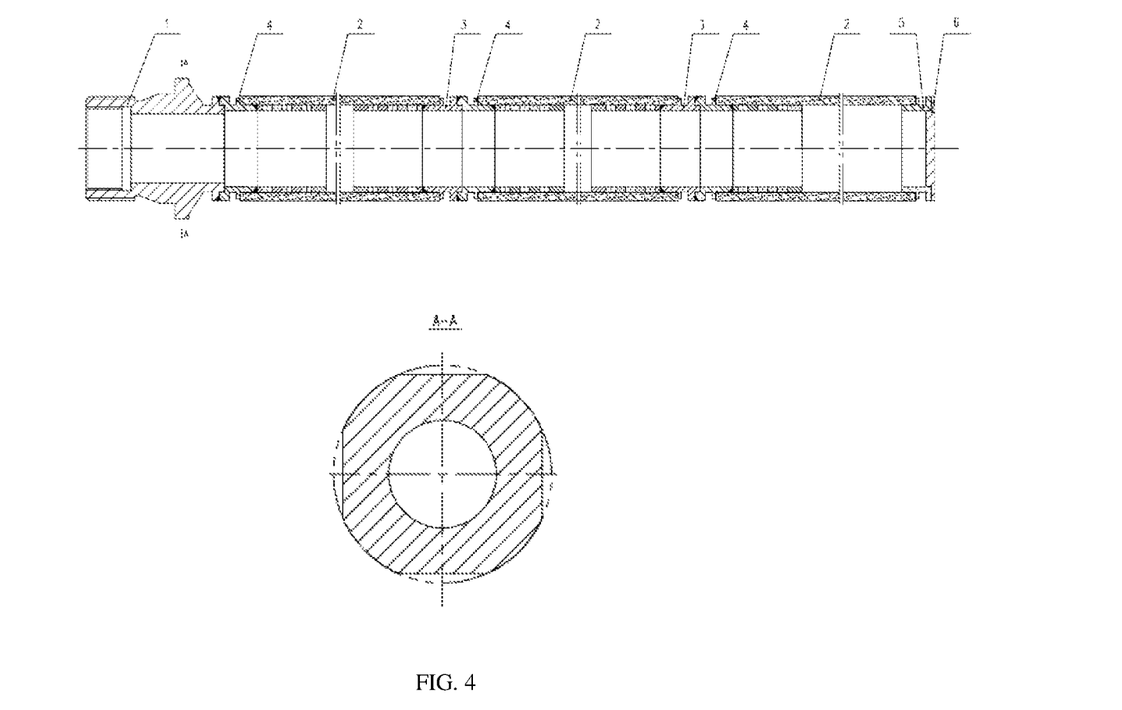
FIG. 4 is a schematic diagram of a structure of a filter-element part, which is in a three-segment structure, in a Fe—Al intermetallic compound filter element in accordance with the present disclosure.

FIG. 4 is a schematic diagram of a structure of a filter-element part, which is in a three-segment structure, in a Fe—Al intermetallic compound filter element in accordance with the present disclosure. As FIG. 4 shows, in the Fe—Al intermetallic compound filter element in accordance with the present disclosure, a single filter-element part is formed by means of welding three segments of Fe—Al-intermetallic-compound-powder-made filter-element powder tube 2 end-to-end through a respective connector, wherein, the connector include the upper connecting ring 3, the lower connecting ring 4 and the bottom sealing ring 5. Any two adjacent segments of filter-element powder tube 2 are connected together through the upper connecting ring 3 and the lower connecting ring 4 by means of welding, while the last segment of filter-element powder tube 2 is connected through the bottom sealing ring 5 to a bottom cover 6 by means of welding, and the first segment of filter-element powder tube 2 is connected through the lower connecting ring 4 to the connection head 1 by means of welding, wherein, all welding is performed by using fusion welding. In this way, the single filter-element part is obtained.

It should be noted that, for simplicity of description, FIGS. 1 and 4 illustrate a filter-element part in a two-segment and a three-segment structure, respectively. Likewise, for a filter-element part in a multi-segment structure with more than three segments, its specific implementation is similar to those in FIGS. 1 and 4, that is, any two adjacent segments of filter-element powder tube are connected together through the upper connecting ring and the lower connecting ring by means of welding, while the last segment of filter-element powder tube is connected through the bottom sealing ring to a bottom cover by means of welding, and the first segment of filter-element powder tube is connected through the lower connecting ring to the connection head by means of welding, wherein, all welding is performed by using fusion welding; in this way, the single filter-element part in a multi-segment structure is obtained.

Figure 5:
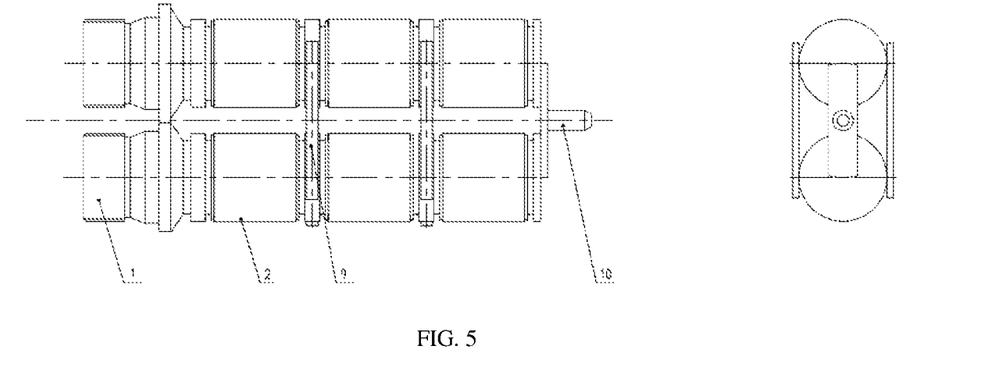
FIG. 5 is a schematic diagram of a structure of a Fe—Al intermetallic compound filter element (having two filter-element parts) in accordance with the present disclosure.

FIG. 5 is a schematic diagram of a structure of a Fe—Al intermetallic compound filter element in accordance with the present disclosure. As shown in FIG. 5, the Fe—Al intermetallic compound filter element comprises two filter-element parts, which form a group and are secured by welding of a rebar 9 on both lateral sides at the positions of the connectors respectively, wherein, the bottoms of the two filter-element parts are connected together by the positioning pin 10, thus the two filter-element parts share the one common positioning pin 10.

It should be noted that, although the Fe—Al intermetallic compound filter elements shown in FIGS. 3 and 5 comprises two filter-element parts and three filter-element parts, respectively, the Fe—Al intermetallic compound filter element in accordance with the present disclosure may simply consist of a group of at least two filter-element parts, with connections similar to those in FIGS. 3 and 5, which can be easily understood by a person of ordinary skill in the art, and therefore, description of which is omitted herein.

The Fe—Al intermetallic compound powder filter element of the present disclosure, because of its special intermetallic compound material and special pore structure, has many excellent properties such as high accuracy, high flux, high strength, good regeneration performance, high-temperature resistance, corrosion resistance, impact resistance and wear resistance, etc., making it especially suitable for precision filtration and gas-solid separation and so on under high-temperature, high-pressure and corrosive environment. Fe—Al filter elements can be used in all fields involving applications of or direct purification and de-dusting of dust-containing gases at high temperatures. The present disclosure selects Fe—Al intermetallic compound as medium of a filter element of a coke filter for E-gas coal gasification process. The longitudinal structure of the Fe—Al intermetallic compound filter-element part adopts a structure composed of at least two segments of powder body connected through a dense ring by means of welding, which improves structural strength of individual filter-element parts while facilitating welding of a rebar on the connecting ring; the transverse cross-sectional structure of the filter-element powder tube adopts an asymmetric composite structure, which, together with measures such as refining powder particle size of the surface filter membrane and reducing thickness of the surface filter membrane, etc., improves fluid flux and backwash regeneration effect while ensuring filtration accuracy, reduces differential pressure of a related filter in operation, and ensures long-term safe and stable operation of the filter. The filter element is installed in a way that at least two filter-element parts are integrated into a group and secured by welding rebars at the positions of the connecting rings respectively, which can effectively improve overall structural strength of the filter element, prevent deformation or fracture of the filter element in use, and improve reliability of the filter element.

In the $Fe_3Al$ intermetallic compound filter element of the present disclosure, mainly included are: techniques for preparing the filter element, techniques for designing the longitudinal structure and transverse cross-sectional structure of the filter element, and designs for the installation method of the filter element. The longitudinal structure of the filter element adopts a structure composed of at least two segments of powder body, where middle portions of the structure are connected through a dense (i.e., solid) connecting ring into a whole single filter-element part by means of welding, so as to improve structural strength of the filter element, in the meantime, such structure facilitates welding of a rebar at the position of the connecting ring, thus at least two filter-element parts can be integrated into a filter element, thereby obtaining a higher overall structural strength; the transverse cross-sectional structure of the filter element of the present disclosure adopts an asymmetric composite structure made up of "substrate framework+surface filtration membrane". The substrate has a relatively large thickness, a relatively high strength, a relatively large pore size and good aeration, and thus can improve fluid flux, while the surface filtration membrane has a relatively thin thickness and a relatively small pore size, and thus can improve filtration accuracy when filtering from outside to inside. The powder particles of the filter element from inside to outside are from coarse to fine, and the cross-sectional microstructure is generally in an inverted trumpet shape, which helps to improve dust-cleaning effect during back-blowing from inside to outside; therefore, the asymmetric filter element not only has high accuracy and high flux, but also has good backwashing and regeneration effect. By connecting three filter-element parts into one group with the use of rebars and adopting welding process, a connection between the group of filter-element parts and a tubesheet can be accomplished. By adopting the construction mode of the filter element in FIG. 3, overall structural strength of the filter element can be effectively improved. In addition, a group of filter-element parts share one positioning pin, which can effectively reduce the number of positioning holes on a positioning tube-bundle plate, facilitate alignment of the positioning pin and the positioning hole, and reduce difficulty in installation of the filter-element. Further, the tubesheet is connected through a tie rod to the tube-bundle plate.

Figure 6:
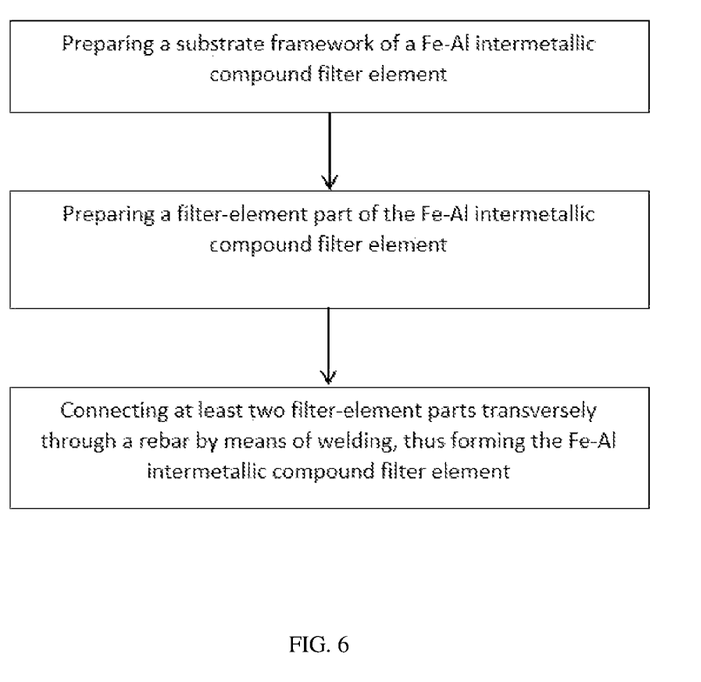
FIG. 6 is a flow chart of a method for preparing a Fe—Al intermetallic compound filter element in accordance with the present disclosure.

Now referring to the flow chart of FIG. 6, a method for preparing a Fe—Al intermetallic compound filter element in accordance with the present disclosure will be described in detail, which comprises the following steps.

1. Preparing powder raw materials. Fe—Al intermetallic compound with good resistance to high-temperature oxidation and sulfide corrosion is selected as medium of a filter element of a coke filter for E-gas coal gasification process, and according to requirements on the filter's filtration accuracy and permeability, pre-alloyed Fe—Al intermetallic powders that have appropriate particle sizes for a substrate and a surface filtration membrane are sieved out (for details on a preparation method of pre-alloyed Fe—Al intermetallic compound powder, see Patent No. ZL 200610057538.1, titled "PREPARATION METHOD AND USE OF IRON-ALUMINUM-BASED INTERMETALLIC COMPOUND MICROPOROUS FILTER ELEMENT").

2. Isostatic molding. The sieved-out substrate powder is loaded and filled in a mold and vibrated for uniformity on a vibrating platform, then the mold is placed in a cold isostatic pressing machine for pressing with a molding pressure of 150-200 MPa, thus producing a single-segment tubular filter-element powder green body. Dimensions of the filter element are designed according to actual working conditions.

3. Vacuum high-temperature sintering. The pressed-and-molded green body is loaded into a combustion boat, and in order to prevent longitudinal bending deformation of the green body, the green body is placed vertically in the combustion boat, and buried around with a flexible constraining substance for vacuum high-temperature constrained sintering. In this step, vacuum is generally controlled at $10^{-2}$-$10^{-3}$ Pa; sintering temperature is 1100-1300° C., and sintering retention time is 1-5 h. In this way, a filter-element substrate of the Fe—Al intermetallic compound filter element is obtained. The filter-element substrate is cut in an appropriate dimension by laser cutting or a tube-cutting machine, to form a substrate framework with appropriate dimensions.

In other words, in the method of the present disclosure, the first is to prepare a substrate framework of the Fe—Al intermetallic compound filter element, and the substrate framework is prepared by isostatically pressing and molding the Fe—Al intermetallic compound powder and then vacuum sintering an isostatically-pressed-and-molded tubular filter-element powder green body at high temperature.

4. Single-segment girth welding. For the welding, a connector and the substrate framework are secured onto a single-segment girth welding fixture to ensure gap-free assembly of the substrate framework and an end face of the connector, and then they are welded by using plasma arc welding or argon arc welding. The connector includes an upper connecting ring, a lower connecting ring and a bottom sealing ring. The connector is made of a stainless steel material, such as 304, 316, 316L, 310S, etc. Preferably, the welding is performed using plasma welding, and welding process parameters are as follows: welding current 50-60 A, argon gas flow rate 10-15 L/min, welding speed 150-180 mm/min, ion gas flow rate 1±0.1 L/min, welding wire using GCrMo91 wire.

5. Preparing surface filtration membrane. A wet spray coating method is adopted for preparing surface filtration membrane. Firstly, a powder suspension slurry is made by adding pre-alloyed Fe—Al aerosolized spherical powder or water atomized powder of certain particle size and a binder material to a certain amount of water in a certain proportion and mixing them into a uniform mixture by means of ultrasonic vibration, motor stirring, etc. Thereafter, spray coating is carried out by a self-made automatic powder spray coating machine, with coating thickness adjustable through adjustment of spray coating pressure, spray coating speed and spray coating times. The binder selected is at least one of polyethylene glycol, methyl cellulose, and polyvinyl alcohol. The powder suspension slurry has a weight ratio of binder:water:powder=1-10:100:200-300.

6. Secondary vacuum sintering. The sintering is carried out with stages of temperature retention, to ensure that the binder evaporates as much as possible during a sintering process so as to prevent binder residue from affecting performance of the filter element, wherein the sintering process is carried out as follows: sintering for 1-2 h to 450-550° C., retaining temperature for 1-2 h, sintering for 2-3 h to 1100-1200° C., retaining temperature for 2-4 h, then cooling with the furnace, thus obtaining an asymmetric composite structure made up of "substrate framework+surface filtration membrane".

In other words, in the method of the present disclosure, two segments of the Fe—Al intermetallic compound powder substrate framework are welded together end-to-end, through a connector respectively, and undergo secondary vacuum sintering after being coated with a filtration membrane, thus forming a single filter-element part of the Fe—Al intermetallic compound filter element. Here, it should be noted that, the same effect can be achieved by firstly preparing the filtration membrane and then performing girth welding, of which specific implementation will be same as in respective steps.

7. Finished-product assembly welding. The welding is performed by using fusion welding (e.g. argon arc welding, plasma welding or laser welding, etc.). A single segment of filter-element powder tube already welded with a connector is connected through an upper connecting ring and a lower connecting ring to another segment by means of welding, while the last segment of filter-element powder tube is connected through a bottom sealing ring to a bottom cover by means of welding, and the first segment of filter-element powder tube is connected through the lower connecting ring to a connection head by means of welding, thus obtaining a single filter-element part. Then, group welding is carried out as follows: every three filter-element parts are welded into one group, that is, the connection heads welded on the three filter-element parts respectively are secured by nuts onto a welding fixture, and the bottoms of the three filter-element parts are secured by a positioning plate, then three rebars are welded at the portions of the connectors connecting two segments of substrate framework, and then a positioning pin assembly is welded to the bottom covers of the filter-element parts, thereafter, length is measured and recorded by using the welding fixture, thus obtaining a filter element composed of a group of three filter-element parts. The connectors, bottom covers, rebars and positioning pin assembly are all made of a stainless steel material, such as 304, 316, 316L, 310S, etc.

In other words, in the present disclosure, a Fe—Al intermetallic compound filter element is prepared by connecting at least two filter-element parts transversely through rebars by means of welding.

In addition, it should be noted that, in the method of the present disclosure described above, although a single filter-element part in a two-segment structure and a filter element composed of a group of three filter-element parts are used, a person of ordinary skill in the art can fully and clearly envisage other embodiments where a single filter-element part in an at-least-two-segment structure and a filter element composed of a group of at least two filter-element parts would be adopted, and these embodiments are not depart from the substance of the present disclosure.

Hereinafter, to further describe the preparation method of the present disclosure with more clarity, various specific examples of the Fe—Al intermetallic compound filter element of the present disclosure utilizing $Fe_3Al$ and FeAl intermetallic compound filter media respectively, are given below, in which specific preparation parameters in the preparation method are set out in detail as well.

Example 1

(1) Preparing powder raw materials. Selecting −40+100 mesh pre-alloyed water atomized $Fe_3Al$ powder as substrate powder, and −500 mesh aerosolized $Fe_3Al$ powder as surface-filtration-membrane powder.

(2) Isostatic molding. Loading and filling the −40+100 mesh substrate powder in a mold and vibrating it for uniformity on a vibrating platform, then placing the mold in a cold isostatic pressing machine for pressing with a molding pressure of 180 MPa, thus producing a single-segment tubular filter-element powder green body. The dimensions of the tubular green body are: outer diameter φ60±1 mm, wall thickness 5±2 mm, and length 1250±5 mm.

(3) Vacuum high-temperature sintering. Loading the pressed-and-molded tubular green body into a combustion boat, and in order to prevent longitudinal bending deformation of the tubular green body, placing the tubular green body vertically in the combustion boat, and burying around it with a flexible constraining substance for vacuum high-temperature constrained sintering. In this step, vacuum is generally controlled at $10^{-2}$-$10^{-3}$ Pa; sintering temperature is 1300° C., and temperature retention time is 3 h. Thus, a filter-element substrate framework is obtained.

(4) Single-segment girth welding. Cutting the filter-element substrate in length of 1164 mm by laser cutting; then, for the welding, securing a connector and the filter-element substrate onto a single-segment girth welding fixture to ensure gap-free assembly of the filter-element substrate and an end face of the connector, and then welding them by using plasma welding. In this step, welding process parameters are: plasma welding current 55 A, argon gas flow rate 10-15 L/min, welding speed 160 mm/min, and ion gas flow rate 1±0.1 L/min. Specifically, the welding is carried out as follows: firstly, turning on "welding torch fuel-gas" and shielding gas in a shield, wherein, argon gas flow rate in the shield is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the filter-element substrate. Materials and dimensions of the connectors are selected as follows: an upper connecting ring assembly is of 310S stainless steel and dimensions φ60×63 mm, a lower connecting ring assembly is of 310S stainless steel and dimensions φ60×62 mm, and a bottom sealing ring is of 310S stainless steel and dimensions φ60×17 mm.

(5) Preparing surface filtration membrane. Adopting a wet spray coating method for preparing surface filtration membrane, that is, firstly, making a powder suspension slurry by adding −500 mesh pre-alloyed $Fe_3Al$ aerosolized spherical powder and a binder material to a certain amount of water in a certain proportion and mixing them into a uniform mixture by means of ultrasonic vibration, motor stirring, etc., wherein the slurry has a ratio of 5 g polyvinyl alcohol+ 100 ml water+250 g powder; then, using a self-made automatic powder spray coating machine for spray coating, and adjusting coating thickness by adjusting spray coating pressure, spray coating speed and spray coating times.

(6) Secondary vacuum sintering. Sintering with stages of temperature retention, to ensure that the binder evaporates as much as possible during a sintering process so as to prevent binder residue from affecting performance of the filter element, wherein the sintering process is carried out as follows: sintering for 1 h to 450° C., retaining temperature for 2 h, sintering for 3 h to 1150° C., retaining temperature for 4 h, then cooling with the furnace, thus obtaining an asymmetric composite structure made up of "substrate framework+surface filtration membrane", as shown in FIG. 2.

(7) Finished-product assembly welding. Adopting argon arc welding to perform the welding, with welding process as follows: bottom cover welding, which is carried out by assembling and putting a positioning pin (denoted as 10 in FIG. 3) and a bottom sealing ring (denoted as 5 in FIG. 1) of a lower segment of filter-element powder tube in place and securing them onto a girth welding fixture, then switching on a rotating mechanism and pressing an arc start switch, thereafter, filling filler wire and full welding around whole perimeter; two-segment spot welding, which is carried out by assembling and putting an upper and a lower segments of filter-element powder tube in place onto a docking fixture, and spot-welding the connectors evenly at three points along a circumferential direction, with each welding spot being 3-5 mm in length; two-segment welding, which is carried out by securing the already spot-welded two segments of filter-element powder tube onto a single-part girth welding fixture, switching on the rotating mechanism and pressing the arc start switch, filling filler wire and full welding around whole perimeter; connection head welding, which is carried out by securing an assembled filter-element part and a connection head onto a single-part girth welding fixture, switching on the rotating mechanism for welding, filling filler wire and full welding around whole perimeter, thus obtaining a single filter-element part having a structure as shown in the schematic diagram of FIG. 1; group welding, that is, welding every three filter-element parts into one group, which is carried out by securing connection heads, welded on three filter-element parts respectively, by nuts onto a welding fixture, and securing the bottoms of the three filter-element parts by a positioning plate, then welding three rebars (denoted as 9 in FIG. 3) at the portions of the connectors connecting two segments of filter-element powder tube, and then welding a positioning pin assembly to the bottom covers of the filter-element parts, thereafter, measuring and recording length by using the welding fixture, thus obtaining a single filter-element part in a two-segment structure and a filter element composed of a group of three filter-element parts, as shown in the schematic diagram of FIG. 3. The connection heads, bottom covers, positioning pin assembly and rebars are made of 310S stainless steel, with dimensions of φ81×81 mm, φ60 mm, φ14, 90×12×3 mm, respectively.

Example 2

(1) Preparing powder raw materials. Selecting −60+150 mesh pre-alloyed water atomized $Fe_3Al$ powder as substrate powder, and −500 mesh aerosolized $Fe_3Al$ powder as surface-filtration-membrane powder.

(2) Isostatic molding. Loading and filling the −60+150 mesh substrate powder in a mold and vibrating it for uniformity on a vibrating platform, then placing the mold in a cold isostatic pressing machine for pressing with a molding pressure of 200 MPa, thus producing a single-segment tubular filter-element powder green body. The dimensions of the tubular green body are: outer diameter φ60±1 mm, wall thickness 5±2 mm, and length 1180±5 mm.

(3) Vacuum high-temperature sintering. Loading the pressed-and-molded tubular green body into a combustion boat, and in order to prevent longitudinal bending deformation of the tubular green body, placing the tubular green body vertically in the combustion boat, and burying around it with a flexible constraining substance for vacuum high-temperature constrained sintering. In this step, vacuum is generally controlled at $10^{-2}$-$10^{-3}$ Pa; sintering temperature is 1250° C., and temperature retention time is 5 h. Thus, a filter-element substrate framework is obtained.

(4) Single-segment girth welding. Cutting the filter-element substrate in length of 1089 mm by laser cutting; then, for the welding, securing a connector and the filter-element substrate onto a single-segment girth welding fixture to ensure gap-free assembly of the filter-element substrate and an end face of the connector, and then welding them by using plasma welding. In this step, welding process parameters are: plasma welding current 60 A, argon gas flow rate 10-15 L/min, welding speed 150 mm/min, and ion gas flow rate 1±0.1 L/min. Specifically, the welding is carried out as follows: firstly, turning on "welding torch fuel-gas" and shielding gas in a shield, wherein, argon gas flow rate in the shield is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the filter-element substrate. Materials and dimensions of the connectors are selected as follows: an upper connecting ring assembly is of 316L stainless steel and dimensions φ60×63 mm, a lower connecting ring assembly is of 316L stainless steel and dimensions φ60×62 mm, and a bottom sealing ring is of 316L stainless steel and dimensions φ60×17 mm.

(5) Preparing surface filtration membrane. Adopting a wet spray coating method for preparing surface filtration membrane, that is, firstly, making a powder suspension slurry by adding −500 mesh pre-alloyed $Fe_3Al$ aerosolized spherical powder and a binder material to a certain amount of water in a certain proportion and mixing them into a uniform mixture by means of ultrasonic vibration, motor stirring, etc., wherein, the slurry has a ratio of 2 g methyl cellulose+100 ml water+250 g powder; then, using a self-made automatic powder spray coating machine for spray coating, and adjusting coating thickness by adjusting spray coating pressure, spray coating speed and spray coating times.

(6) Secondary vacuum sintering. Sintering with stages of temperature retention, to ensure that the binder evaporates as much as possible during a sintering process so as to prevent binder residue from affecting performance of the filter element, wherein the sintering process is carried out as follows: sintering for 1.5 h to 550° C., retaining temperature for 1 h, sintering for 3 h to 1200° C., retaining temperature for 3 h, then cooling with the furnace, thus obtaining an asymmetric composite structure made up of "substrate framework+surface filtration membrane", as shown in FIG. 2.

(7) Finished-product assembly welding. Adopting argon arc welding to perform the welding, with welding process as follows: bottom cover welding, which is carried out by assembling and putting a positioning pin (denoted as 10 in FIG. 3) and a bottom sealing ring (denoted as 5 in FIG. 1) of a lower segment of filter-element powder tube in place and securing them onto a girth welding fixture, then switching on a rotating mechanism and pressing an arc start switch, thereafter, filling filler wire and full welding around whole perimeter; two-segment spot welding, which is carried out by assembling and putting an upper and a lower segments of filter-element powder tube in place onto a docking fixture, and spot-welding the connectors evenly at three points along a circumferential direction, with each welding spot being 3-5 mm in length; two-segment welding, which is carried out by securing the already spot-welded two segments of filter-element powder tube onto a single-part girth welding fixture, switching on the rotating mechanism and pressing the arc start switch, filling filler wire and full welding around whole perimeter; connection head welding, which is carried out by securing an assembled filter-element part and a connection head onto a single-part girth welding fixture, switching on the rotating mechanism for welding, filling filler wire and full welding around whole perimeter, thus obtaining a single filter-element part having a structure as shown in the schematic diagram of FIG. 1; group welding, that is, welding every three filter-element parts into one group, which is carried out by securing connection heads, welded on three filter-element parts respectively, by nuts onto a welding fixture, and securing the bottoms of the three filter-element parts by a positioning plate, then welding three rebars (denoted as 9 in FIG. 3) at the portions of the connectors connecting two segments of filter-element powder tube, and then welding a positioning pin assembly to the bottom covers of the filter-element parts, thereafter, measuring and recording length by using the welding fixture, thus obtaining a single filter-element part in a two-segment structure and a filter element composed of a group of three filter-element parts, as shown in the schematic diagram of FIG. 3. The connection heads, bottom covers, positioning pin assembly and rebars are made of 316 stainless steel, with dimensions of φ81×81 mm, φ60 mm, φ14, 90×12×3 mm, respectively.

Example 3

(1) Preparing powder raw materials. Selecting −40+150 mesh pre-alloyed water atomized FeAl powder as substrate powder, and −500 mesh aerosolized FeAl powder as surface-filtration-membrane powder.

(2) Isostatic molding. Loading and filling the −40+150 mesh substrate powder in a mold and vibrating it for uniformity on a vibrating platform, then placing the mold in a cold isostatic pressing machine for pressing with a molding pressure of 150 MPa, thus producing a single-segment tubular filter-element powder green body. The dimensions of the tubular green body are: outer diameter φ60±1 mm, wall thickness 5±2 mm, and length 850±5 mm.

(3) Vacuum high-temperature sintering. Loading the pressed-and-molded tubular green body into a combustion boat, and in order to prevent longitudinal bending deformation of the tubular green body, placing the tubular green body vertically in the combustion boat, and burying around it with a flexible constraining substance for vacuum high-temperature constrained sintering. In this step, vacuum is generally controlled at $10^{-2}$-$10^{-3}$ Pa; sintering temperature is 1240° C., and temperature retention time is 4 h. Thus, a filter-element substrate framework is obtained.

(4) Single-segment girth welding. Cutting the filter-element substrate in length of 780 mm by laser cutting; then, for the welding, securing a connector and the filter-element substrate onto a single-segment girth welding fixture to ensure gap-free assembly of the filter-element substrate and an end face of the connector, and then welding them by using plasma welding. In this step, welding process parameters are: plasma welding current 60 A, argon gas flow rate 10-15 L/min, welding speed 150 mm/min, and ion gas flow rate 1±0.1 L/min. Specifically, the welding is carried out as follows: firstly, turning on "welding torch fuel-gas" and shielding gas in a shield, wherein, argon gas flow rate in the shield is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the filter-element substrate. Materials and dimensions of the connectors are selected as follows: an upper connecting ring assembly is of 310S stainless steel and dimensions φ60×63 mm, a lower connecting ring assembly is of 310S stainless steel and dimensions φ60×62 mm, and a bottom sealing ring is of 310S stainless steel and dimensions φ60×17 mm.

(5) Preparing surface filtration membrane. Adopting a wet spray coating method for preparing surface filtration membrane, that is, firstly, making a powder suspension slurry by adding −500 mesh pre-alloyed FeAl aerosolized spherical powder and a binder material to a certain amount of water in a certain proportion and mixing them into a uniform mixture by means of ultrasonic vibration, motor stirring, etc., wherein, the slurry has a ratio of 5 g methyl cellulose+100 ml water+250 g powder; then, using a self-made automatic powder spray coating machine for spray coating, and adjusting coating thickness by adjusting spray coating pressure, spray coating speed and spray coating times.

(6) Secondary vacuum sintering. Sintering with stages of temperature retention, to ensure that the binder evaporates as much as possible during a sintering process so as to prevent binder residue from affecting performance of the filter element, wherein the sintering process is carried out as follows: sintering for 1 h to 500° C., retaining temperature for 2 h, sintering for 3 h to 1100° C., retaining temperature for 4 h, then cooling with the furnace, thus obtaining an asymmetric composite structure made up of "substrate framework+surface filtration membrane", as shown in FIG. 2.

(7) Finished-product assembly welding. Adopting argon arc welding to perform the welding, with welding process as follows: bottom cover welding, which is carried out by assembling and putting a positioning pin (denoted as 10 in FIG. 5) and a bottom sealing ring (denoted as 5 in FIG. 4) of a lower segment of filter-element powder tube in place and securing them onto a girth welding fixture, then switching on a rotating mechanism and pressing an arc start switch, thereafter, filling filler wire and full welding around whole perimeter; two-segment spot welding, which is carried out by assembling and putting an upper and a lower segments of filter-element powder tube in place onto a docking fixture, and spot-welding the connectors evenly at three points along a circumferential direction, with each welding spot being 3-5 mm in length; two-segment welding, which is carried out by securing the already spot-welded two segments of filter-element powder tube onto a single-part girth welding fixture, switching on the rotating mechanism and pressing the arc start switch, filling filler wire and full welding around whole perimeter; connection head welding, which is carried out by securing an assembled filter-element part and a connection head onto a single-part girth welding fixture, switching on the rotating mechanism for welding, filling filler wire and full welding around whole perimeter, thus obtaining a single filter-element part having a structure as shown in the schematic diagram of FIG. 4; group welding, that is, welding every two filter-element parts into one group, which is carried out by securing connection heads, welded on two filter-element parts respectively, by nuts onto a welding fixture, and securing the bottoms of the two filter-element parts by a positioning plate, then welding a rebar (denoted as 9 in FIG. 5) at the portions of the connectors connecting two segments of filter-element powder tube, and then welding a positioning pin assembly to the bottom covers of the filter-element parts, thereafter, measuring and recording length by using the welding fixture, thus obtaining a single filter-element part in a three-segment structure and a filter element composed of a group of two filter-element parts, as shown in the schematic diagram of FIG. 5. The connection heads, bottom covers, positioning pin assembly and rebars are made of 310S stainless steel, with dimensions of φ81×81 mm, φ60 mm, φ14, 90×12×3 mm, respectively.

It should be noted that, based on the above detailed description of the present disclosure, a person of ordinary skill in the art can fully and clearly envisage similar embodiments for Fe—Al intermetallic compounds other than $Fe_3Al$ and FeAl intermetallic compounds, therefore, description of them is omitted here.

At the end, a method for welding Fe—Al intermetallic compound microporous material to stainless steel is described in detail, which is used to implement welding a filter-element powder tube to a connector in the present disclosure.

Figure 7:
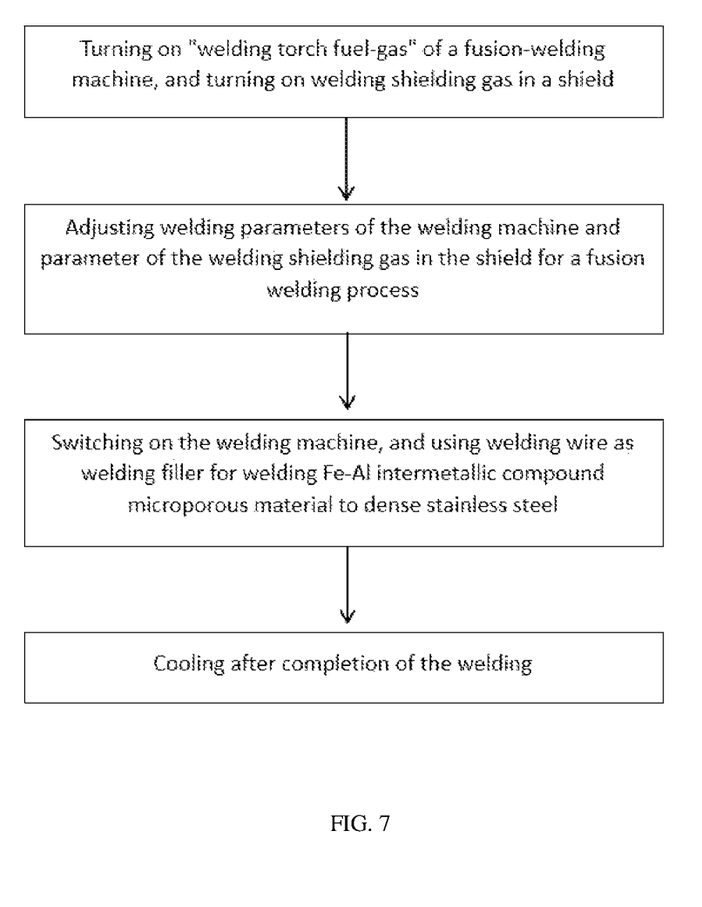
FIG. 7 is a flow chart of a method for welding a Fe—Al intermetallic compound microporous material to dense stainless steel.

Referring to FIG. 7, in the method for welding Fe—Al intermetallic compound microporous material to dense stainless steel, firstly, turning on "welding torch fuel-gas" of a fusion-welding machine, and turning on welding shielding gas in a shield, in which the shield is used to protect the Fe—Al intermetallic compound microporous material; next, adjusting welding parameters of the welding machine and parameter of the welding shielding gas in the shield for a fusion welding process; then, adjusting welding torch position, pressing an arc start switch, and using welding wire as welding filler for welding the Fe—Al intermetallic compound microporous material to dense stainless steel; and, cooling in the shield after completion of the welding.

In the method for welding Fe—Al intermetallic compound microporous material to dense stainless steel, the welding wire material preferably adopts GCrMo91 (C<0.1% wt, Cr<8-10% wt, Mo<1% wt) heat-resistant steel welding wire, ER310S welding wire or ERNiCr-3 welding wire, as welding filler. The welding method adopts fusion welding, and preferably adopts argon arc welding, plasma welding or laser welding for performing welding. In the welding method, high-quality welding between the Fe—Al material and solid stainless steel is achieved by using welding wire and providing multi-channel welding shielding gas (i.e., welding shielding gas from the welding torch itself and welding shielding gas newly introduced into the shield) to a joint area during the welding process. Further, through optimization of process parameters (welding current, welding voltage, welding speed, shielding gas flow rate), the method has better effect.

Figure 8:
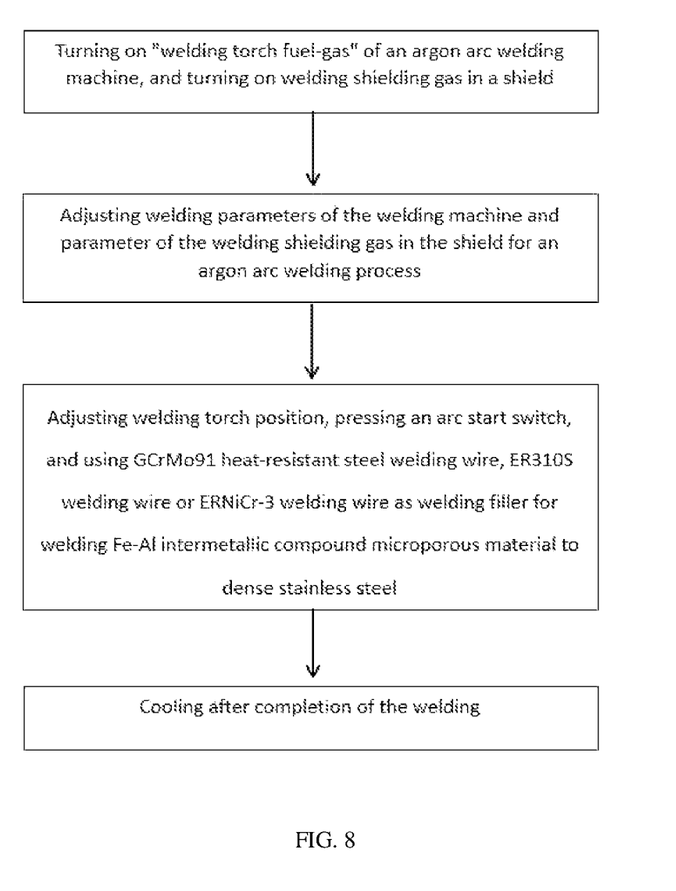
FIG. 8 is a flow chart of a method for welding a Fe—Al intermetallic compound microporous material to dense stainless steel, wherein argon arc welding is used.

FIG. 8 shows a flow chart of a method for welding a Fe—Al intermetallic compound microporous material to dense stainless steel, wherein argon arc welding is used. The steps are as follows: firstly, turning on "welding torch fuel-gas" of an argon arc welding machine, and turning on welding shielding gas in a shield, where the shield is used to protect the Fe—Al intermetallic compound microporous material; next, adjusting welding parameters of the welding machine and parameter of the welding shielding gas in the shield for an argon arc welding process; then, adjusting welding torch position, pressing an arc start switch, and using welding wire, for example, GCrMo91 heat-resistant steel welding wire, or ER310S welding wire or ERNiCr-3 welding wire, as welding filler for welding the Fe—Al intermetallic compound microporous material to dense stainless steel, where the composition in GCrMo91 heat-resistant steel welding wire are C<0.1% wt, Cr<8-10% wt, Mo<1% wt; and, cooling in the shield after completion of the argon arc welding.

In the specific welding method in FIG. 8:

A girth automatic argon arc welding machine is adopted as the argon arc welding equipment; and during welding, Fe—Al alloy in a fusion zone, especially the element Al, is prone to oxidation, therefore, in addition to process parameters such as welding speed, welding voltage, welding current, argon gas flow rate, etc., major focus should be placed on approaches for protecting a welding joint portion (including weld seam, fusion zone, and heat-affected zone) with welding shielding gas. Welding process parameters used with the argon arc welding are: welding current 65-75 A, welding voltage 12.4V, welding speed 150-210 mm/min, in-welding-torch argon gas flow rate 20 L/min, and in-shield argon gas (shielding gas) flow rate 10-15 L/min.

Figure 9:
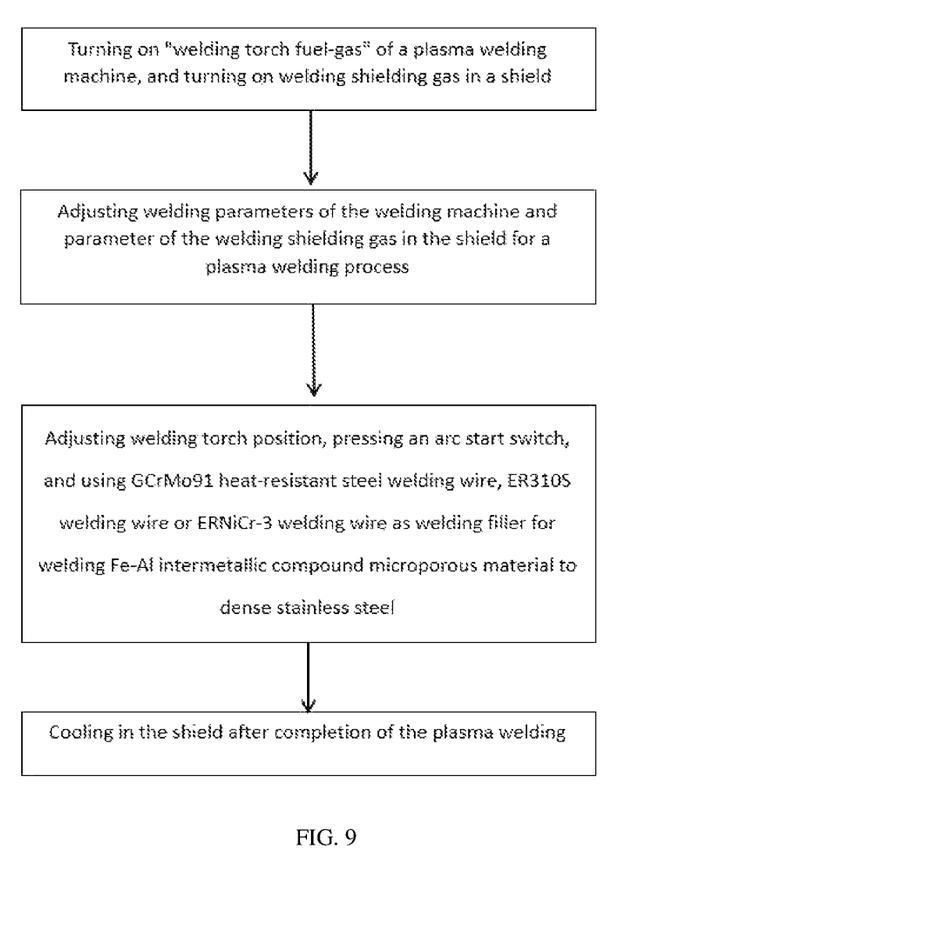
FIG. 9 is a flow chart of a method for welding a Fe—Al intermetallic compound microporous material to dense stainless steel, wherein plasma welding is used.

FIG. 9 shows a flow chart of a method for welding a Fe—Al intermetallic compound microporous material to dense stainless steel, wherein plasma welding is used. The steps are as follows: firstly, turning on "welding torch fuel-gas" of a plasma welding machine, and turning on welding shielding gas in a shield, where the shield is used to protect the Fe—Al intermetallic compound microporous material; next, adjusting welding parameters of the welding machine and parameter of the welding shielding gas in the shield for a plasma welding process; then, adjusting welding torch position, pressing an arc start switch, and using welding wire, for example, GCrMo91 heat-resistant steel welding wire, or ER310S welding wire or ERNiCr-3 welding wire, as welding filler for welding the Fe—Al intermetallic compound microporous material to dense stainless steel, where the composition in GCrMo91 heat-resistant steel welding wire are C<0.1% wt, Cr<8-10% wt, Mo<1% wt; and, cooling in the shield after completion of the plasma welding.

In the specific welding method in FIG. 9:

A plasma girth welding machine may be preferably adopted as the plasma welding equipment; and process parameters used with the plasma welding are: welding current 50-60 A, argon gas flow rate 10-15 L/min, welding speed 150-180 mm/min, ionized gas flow rate 1±0.1 L/min, and welding wire material adopting GCrMo91 (C<0.1% wt, Cr<8-10% wt, Mo<1% wt) heat-resistant steel welding wire, ER310S welding wire or ERNiCr-3 welding wire as welding filler. Specifically, when performing the welding, the steps are as follows: firstly, turning on "welding torch fuel-gas" of the welding machine, and turning on shielding gas in a shield, where in-shield argon gas (shielding gas) flow rate is 20-25 L/min; then, switching on a rotating mechanism of the plasma girth welding machine, adjusting welding torch position, pressing an arc start switch, and accomplishing the welding by manual filler-wire filling and full welding around whole perimeter; cooling in the shield for 10 seconds, and then taking out the welded part.

Figure 10:
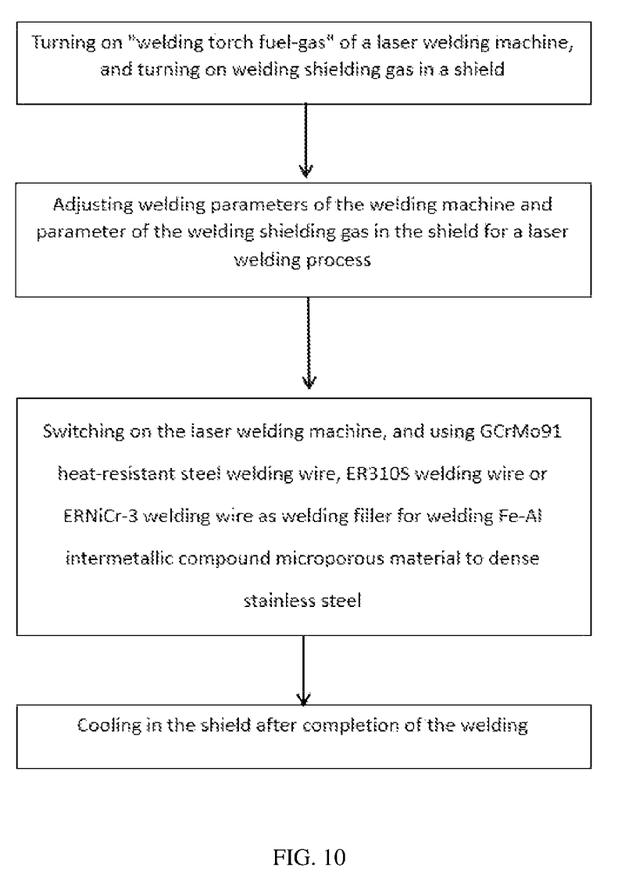
FIG. 10 is a flow chart of a method for welding a Fe—Al intermetallic compound microporous material to dense stainless steel, wherein laser welding is used.

FIG. 10 shows a flow chart of a method for welding a Fe—Al intermetallic compound microporous material to dense stainless steel, wherein laser welding is used. The steps are as follows: firstly, turning on "welding torch fuel-gas" of a laser welding machine, and turning on welding shielding gas in a shield, where the shield is used to protect the Fe—Al intermetallic compound microporous material; next, adjusting welding parameters of the welding machine and parameter of the welding shielding gas for a laser welding process; then, switching on the laser welding machine, and using welding wire, for example, GCrMo91 heat-resistant steel welding wire, or ER310S welding wire or ERNiCr-3 welding wire, as welding filler for welding the Fe—Al intermetallic compound microporous material to dense stainless steel, where the composition in GCrMo91 heat-resistant steel welding wire are C<0.1% wt, Cr<8-10% wt, Mo<1% wt; and, cooling in the shield after completion of the laser welding.

In the specific welding method in FIG. 10:

Welding process parameters used with the laser welding are: welding power 2-3 kw, welding speed 50-100 mm/min, wire feed speed 85-100 mm/s, defocusing amount 6-10 mm, and in-shield argon gas (shielding gas) flow rate 20-25 L/min.

With the above methods, welding portion on a welded part formed by welding Fe—Al intermetallic compound microporous material to dense stainless steel, is firmly bonded and have high stability, with a full and uniform weld seam and no defects such as undercut, surface cracks, seam under-fill, obvious overlap, etc.

That is, in the above welding method, preferable is that:

(1) Fusion welding is performed using argon arc welding, plasma welding or laser welding. High-quality welding between Fe—Al intermetallic compound microporous material and solid stainless steel is accomplished by using welding wire and providing protection with multi-channel shielding gas (i.e., welding shielding gas from the welding torch itself and welding shielding gas newly introduced into the shield) to a joint area during the welding process. Further, through optimization of process parameters, the above welding method can have better effect.

(2) Welding wire material adopts GCrMo91 (C<0.1% wt, Cr<8-10% wt, Mo<1% wt) heat-resistant steel welding wire, ER310S welding wire or ERNiCr-3 alloy, as welding filler.

In the above welding method, effective connection of Fe—Al intermetallic compound microporous material to dense stainless steel is achieved by optimizing welding wire, welding current, welding speed, argon gas flow rate (after welding, tensile strength of a sample is tested with a material universal testing machine, hardness of a welding joint is tested with a Broadway optical hardness tester, microstructure and morphology, composition and phase composition of a welding joint are observed and analyzed with a metallurgical microscope, scanning electron microscope, energy spectrum and X-ray diffractometer, and based on that, a welding process is optimized), as well as approaches for protecting welding joint (i.e., welding shielding gas in a shield is introduced). Weld tensile strength can reach 35-40 MPa, which is higher than strength of ceramic filter material, and the tensile fracture site located in a powder body heat-affected zone. Vibration-based bending fatigue strength of the welding joint is greater than 300N, three-point flexural strength is greater than 700N, and the fracture site is also located in a powder body heat-affected zone immediately adjacent to a weld seam. Weld seams are smooth in appearance, full and uniform, with no defects such as undercut, surface cracks, seam under-fill, obvious overlap, internal cracks, slag inclusions, etc.

In order to further describe the welding method with more clarity, given below are specific implementation of the Fe—Al intermetallic compound microporous material in the forms of $Fe_3Al$ and FeAl intermetallic compound tubes respectively, various examples of their welding to various dense stainless steel connecting rings, and their welding results, wherein various specific implementation parameters of actual welding processes are also set out in detail.

Example 1

Welding of $Fe_3Al$ intermetallic compound tube to 310S stainless steel connecting ring is carried out, with argon arc welding process parameters as follows: current 65 A, voltage 12.4V, welding speed 150 mm/min, argon gas flow rate 20 L/min, in-shield argon gas flow rate 10-15 L/min, and welding wire material adopting GCrMo91 (C<0.1% wt, Cr<8-10% wt, Mo<1% wt) heat-resistant steel welding wire as welding filler. Resulting weld seam is full and uniform, with no defects such as undercut, surface cracks, seam under-fill, obvious overlap, internal cracks, slag inclusions, etc., and weld tensile strength reaches 37 MPa.

Example 2

Welding of $Fe_3Al$ intermetallic compound tube to 310S stainless steel connecting ring is carried out, with argon arc welding process parameters as follows: current 70 A, voltage 12.4V, welding speed 180 mm/min, argon gas flow rate 20 L/min, in-shield argon gas flow rate 10-15 L/min, and welding wire material adopting ER310S welding wire as welding filler. Resulting weld seam is full and uniform, with no defects such as undercut, surface cracks, seam under-fill, obvious overlap, internal cracks, slag inclusions, etc., and weld tensile strength reaches 39 MPa.

Example 3

Welding of $Fe_3Al$ intermetallic compound tube to 304 stainless steel connecting ring is carried out, with argon arc welding process parameters as follows: current 75 A, voltage 12.4V, welding speed 210 mm/min, argon gas flow rate 20 L/min, in-shield argon gas flow rate 10-15 L/min, and welding wire material adopting ERNiCr-3 welding wire as welding filler. Resulting weld seam is full and uniform, with no defects such as undercut, surface cracks, seam under-fill, obvious overlap, internal cracks, slag inclusions, etc., and weld tensile strength reaches 36 MPa.

Example 4

Welding of $Fe_3Al$ intermetallic compound tube to 304 stainless steel connecting ring is carried out, with process parameters as follows: plasma welding current 60 A, argon gas flow rate 15 L/min, welding speed 180 mm/min, ionized gas flow rate 1 L/min, and welding wire material adopting ERNiCr-3 welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 37 MPa.

Example 5

Welding of $Fe_3Al$ intermetallic compound tube to 316 stainless steel connecting ring is carried out, with process parameters as follows: plasma welding current 50 A, argon gas flow rate 10 L/min, welding speed 150 mm/min, ionized gas flow rate 1 L/min, and welding wire material adopting ER310S welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 35 MPa.

Example 6

Welding of $Fe_3Al$ intermetallic compound tube to 310S stainless steel connecting ring is carried out, with process parameters as follows: plasma welding current 55 A, argon gas flow rate 13 L/min, welding speed 160 mm/min, ionized gas flow rate 1 L/min, and welding wire material adopting ERNiCr-3 welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 39 MPa.

Example 7

Welding of $Fe_3Al$ intermetallic compound tube to 316L stainless steel connecting ring is carried out, with laser welding process parameters as follows: welding power 2.35 kw, welding speed 60 mm/min, wire feed speed 100 mm/s (without chamfer) or 85 mm/s (with chamfer), welding duration 19.1 s at defocusing amount of 8 mm, in-shield argon gas flow rate 20-25 L/min, and welding wire material adopting GCrMo91 (C<0.1% wt, Cr<8-10% wt, Mo<1% wt) heat-resistant steel welding wire as welding filler. Resulting weld seam is full and uniform, with no defects such as undercut, surface cracks, seam under-fill, obvious overlap, internal cracks, slag inclusions, etc., and weld tensile strength reaches 35 MPa.

Example 8

Welding of $Fe_3Al$ intermetallic compound tube to 310S stainless steel connecting ring is carried out, with laser welding process parameters as follows: welding power 2 kw, welding speed 50 mm/min, wire feed speed 100 mm/s (without chamfer) or 85 mm/s (with chamfer), defocusing amount 6 mm, in-shield argon gas flow rate 20-25 L/min, and welding wire material adopting GCrMo91 (C<0.1% wt, Cr<8-10% wt, Mo<1% wt) heat-resistant steel welding wire as welding filler. Resulting weld seam is full and uniform, with no defects such as undercut, surface cracks, seam under-fill, obvious overlap, internal cracks, slag inclusions, etc., and weld tensile strength reaches 37 MPa.

Example 9

Welding of $Fe_3Al$ intermetallic compound tube to 304 stainless steel connecting ring is carried out, with laser welding process parameters as follows: welding power 3 kw, welding speed 100 mm/min, wire feed speed 100 mm/s (without chamfer) or 85 mm/s (with chamfer), defocusing amount 10 mm, in-shield argon gas flow rate 20-25 L/min, and welding wire material adopting ERNiCr-3 welding wire as welding filler. Resulting weld seam is full and uniform, with no defects such as undercut, surface cracks, seam under-fill, obvious overlap, internal cracks, slag inclusions, etc., and weld tensile strength reaches 39 MPa.

Example 10

Welding of FeAl intermetallic compound tube to 310S stainless steel connecting ring is carried out, with process parameters as follows: plasma welding current 58 A, argon gas flow rate 15 L/min, welding speed 160 mm/min, ionized gas flow rate 1 L/min, and welding wire material adopting ERNiCr-3 welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 38 MPa.

Apparently, the aforementioned embodiments are merely examples illustrated for clearly describing the present disclosure, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present disclosure.

The invention claimed is:

1. A Fe—Al intermetallic compound filter element, wherein, the Fe—Al intermetallic compound filter element comprises: at least two filter-element parts, and a rebar (9) connecting the at least two filter-element parts transversely by means of welding, wherein, the filter-element parts each comprises: at least two segments of Fe—Al intermetallic compound filter-element powder tube (2), and a connector connecting the at least two segments of Fe—Al intermetallic compound filter-element powder tube (2) end-to-end by means of welding; and wherein, the at least two segments of Fe—Al intermetallic compound filter-element powder tube (2) each comprises: a substrate framework (7) and a surface filtration membrane (8) on an exterior of the substrate framework (7), the substrate framework (7) being a pressed-and-sintered pre-alloyed Fe—Al intermetallic compound powder;

the Fe—Al intermetallic compound filter element comprises three filter-element parts, which form a group transversely and are secured by welding of the rebar (9), the rebar (9) being welded to the three filter-element parts at the position of the connector, respectively;

the surface filtration membrane (8) is a mixture of binder, water and pre-alloyed Fe—Al intermetallic compound powder that has been secondarily sintered after being coated on the substrate framework (7), wherein, the binder is at least one of polyethylene glycol, methyl cellulose, and polyvinyl alcohol;

a cross-sectional structure of the Fe—Al intermetallic compound filter element adopts an asymmetric composite structure made up of the substrate framework and the surface filtration membrane, so that the asymmetric powder filter element has a relatively small pore size, which makes the filter element have high filtration accuracy, in addition, the asymmetric powder filter element is a rigid medium, the asymmetric powder filter element is installed in group, with each group integrating at least two filter-element parts, and is secured by welding of the rebar (9) at a position of a connecting ring respectively.

2. The Fe—Al intermetallic compound filter element according to claim 1, wherein, a weight ratio of all components of the mixture is binder:water:powder=1-10:100:200-300.

3. The Fe—Al intermetallic compound filter element according to claim 1, wherein, the surface filtration membrane (8) has a thickness of 100-200 microns.

4. A method for preparing a Fe—Al intermetallic compound filter element, wherein, the method comprises the steps of:
- preparing a substrate framework (7) of the Fe—Al intermetallic compound filter element, by isostatically pressing and molding pre-alloyed Fe—Al intermetallic compound powder and then vacuum sintering an isostatically pressed and molded green body to form the substrate framework;
- preparing a filter-element part of the Fe—Al intermetallic compound filter element, wherein, at least two segments of the substrate framework are welded together end-to-end, through a connector respectively, and undergo secondary sintering after being coated with a surface filtration membrane (8), thus forming the filter-element part; and
- connecting the at least two filter-element parts transversely through a rebar by means of welding, thus forming the Fe—Al intermetallic compound filter element;
- the step of preparing a filter-element part of the Fe—Al intermetallic compound filter element further comprises the step of coating a surface filtration membrane (8) by using a wet spray coating process, the surface filtration membrane being prepared from a mixture of binder, water and pre-alloyed Fe—Al intermetallic compound powder;
- the binder is at least one of polyethylene glycol, methyl cellulose, and polyvinyl alcohol
- a cross-sectional structure of the Fe—Al intermetallic compound filter element adopts an asymmetric composite structure made up of the substrate framework and the surface filtration membrane, so that the asymmetric powder filter element has a relatively small pore size, which makes the filter element have high filtration accuracy, in addition, the asymmetric powder filter element is a rigid medium, the asymmetric powder filter element is installed in group, with each group integrating at least two filter-element parts, and is secured by welding of the rebar (9) at a position of a connecting ring respectively.

5. The method according to claim 4, wherein, a weight ratio of all components of the mixture is binder:water:powder=1-10:100:200-300.

6. The method according to claim 4, wherein, coating the surface filtration membrane (8) so that the surface filtration membrane has a thickness of 100-200 microns.

7. The Fe—Al intermetallic compound filter element according to claim 2, wherein, the surface filtration membrane (8) has a thickness of 100-200 microns.

8. The method according to claim 5, wherein, coating the surface filtration membrane (8) so that the surface filtration membrane has a thickness of 100-200 microns.

* * * * *